3,535,350
PROCESS FOR THE PREPARATION OF 13-ALKYL-GONA-1,3,5(10),8,14-PENTAEN - 17 - ONES FROM THE CORRESPONDING 17-OLS
Reinhardt P. Stein, Conshohocken, and Herchel Smith, Wayne, Pa., assignors to American Home Products Corporation, New York, N.Y., a corporation of Delaware
No Drawing. Filed Feb. 19, 1968, Ser. No. 706,611
Int. Cl. C07c 167/00
U.S. Cl. 260—397.45    2 Claims

ABSTRACT OF THE DISCLOSURE

Highly sensitive estrogenic steroids, i.e., pentaenes, having a 17-hydroxy group are oxidized to the corresponding ketones without degradation or destruction of the steroid nucleus. The 17-ones so produced are useful intermediates for the preparation of hormonally active steroids.

BACKGROUND OF THE INVENTION

A variety of procedures are known in the art for oxidizing steroids including oxidizing of steroidal alcohols. Many of these are described in the text of Fieser and Fieser "Steroids," published by Reinhold 1959, and elsewhere. Fieser and Fieser mention various acetates, for example, lead tetraacetate, chromates including chromic acid and anhydride, oxides, for example, selenium and magnesium dioxides. Additionally, the Oppenauer oxidation with aluminum isopropoxide has also been suggested. However, in many cases the oxidation is either nonselective or too drastic, resulting in degradation products as illustrated by the action of chromic acid or selenium dioxide, or, over all, there is no disclosure as to the result of oxidizing a highly unsaturated steroid alcohol. This is true also, in the more recent disclosure of an oxidation procedure suggested by Albright and Goldman, using an acid anhydride with dimethyl sulfoxide, J. Amer. Chem. Soc., 87, 4214, 1965. Thus, when dealing with the oxidation of an estra-pentaen-ol there is no clue as to which of the many procedures suggested would be available for converting this highly sensitive alcohol to a ketone. A study of the many suggested procedures resulted in the present invention.

The present invention relates to the preparation of highly unsaturated 17-one steroids and more particularly to the oxidation of estra-pentaen-17-ols to the corresponding 17-ones.

The process involves the single reaction step as illustrated herewith:

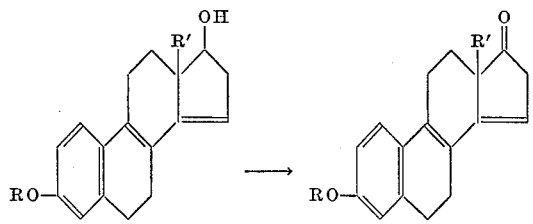

In the above formulae, R is intended to represent a lower alkyl or a cycloalkyl, in either case having no more than 6 carbon atoms, and R' is a lower alkyl of 1 to 4 carbon atoms. The starting compounds may be a dl- or racemic mixture, or the starting substance may be the d- or l- form alone.

The starting compounds are prepared by known procedures, for example, in the form of a racemate as described in the application of Gordon A. Hughes and Herchel Smith, Ser. No. 534,353, filed Mar. 15, 1966. When the starting materials are either the d- or the l- forms, the racemate in the form of a salt, for example, the hemisuccinate, is first reacted with dehydro-abietylamine which forms the d-hemisuccinate amine salt, which is easily separated from the mother liquor. The separated salt is hydrolyzed to remove the amine, and then is treated by alkaline hydrolysis to remove the acid moiety leaving an hydroxy group in its place. If the l-enantiomer is desired, the mother liquor is treated with (—)=ephedrine, thus precipitating the hemisuccinate (—)=ephedrine salt. Acid hydrolysis removes the ephedrine moiety and basic hydrolysis replaces the ester with the hydroxyl group. This procedure is disclosed in Buzby et al., J. Med. Chem., 10, 199 (1967).

The reaction of the 17-ol steroid has been found to proceed with good yield of the corresponding 17-one steroid and without degradation by treating the material with aluminum isopropoxide and methyl ethyl ketone or similar ketone, using a suitable solvent or mixture of solvents, preferably comprising benzene, under refluxing conditions.

Another oxidative procedure which has also been found useful for treating highly sensitive substances such as disclosed here involves the use of an acid anhydride, preferably acetic anhydride, with dimethyl sulfoxide, under room temperature conditions.

The products produced by the reaction are useful intermediates for the preparation of hormonally active compounds. Thus, the products produced by the aforesaid oxidation reactions may be selectively reduced in successive steps, using hydrogen and a suitable hydrogenation catalyst whereby the 14(15) linkage is first reduced, and then that product is again hydrogenated to saturate the 8(9) double bond, resulting in a gona-1,3,5(10)-trien-17-one steroid having estrogenic activity as determined by standard pharmacological procedures, notably as disclosed in Edgren et al. in "Recent Progress in Hormone Research," Academic Press, Inc. (1966), vol. 22, 305–349. Further reduction (Birch) of such compounds, followed by an acid hydrolysis, results in conversion of 3-alkoxy group to a 3-keto group and conversion of the aromatic A-ring to a single unsaturation either in the 4-position or the 5(10)-position. Such compounds are likewise hormonally active, both estrogenically and in other standard pharmacological tests also disclosed by Edgren et al., cited above, and useful to reduce blood cholesterol levels in the test animal. These compounds, and particularly the enantiomers, are therefore useful in the field of experimental and comparative pharmacology. In general the host animal tested is the rat, and the hormonal activity will be found at a single dose level in the range of 0.1 to 10 mg./kg., of body weight, administered subcutaneously.

The following examples illustrate the oxidative procedure in greater detail. Temperatures as given are to be understood as being in degrees centigrade.

Example 1.—dl-3-methoxyestra-1,3,5(10),8,14-pentaen-17-one

Reflux a solution of dl-3-methoxyestra-1,3,5(10),8,14-pentaen-17β-ol (5.00 g.) in benzene (150 ml.) and methyl ethyl ketone (80 ml.) under nitrogen into a water separator for 0.5 hr. Add a filtered solution of aluminum isopropoxide (8 g.) in benzene to the reaction and continue refluxing for 4 hours. Cool, dilute with ether and wash the extract with water, dilute hydrochloric acid and brine then dry, filter and evaporate the solvent in vacuo. Dissolve the oil, in methanol, filter, then scratch the flask to induce crystallization. Filter the crystalline solid to get 2.16 g. of the title product, M.P. 105–108°.

Starting with dl - 13 - ethyl-3-methoxygona-1,3,5(10),8,14-pentaen-17β-ol and carrying out the process of Example 1, the corresponding 17-one compound will be produced in substantially similar yield.

Example 2.—dl-3-methoxyestra-1,3,5(10),8,14-pentaen-17-one

Dissolve dl-3-methoxyestra-1,3,5(10),8,4-pentaen-17β-ol (3.00 g.) in dry dimethylsulfoxide (20 ml.) and acetic anhydride (15 ml.) and allow the solution to stand under nitrogen at room temperature for 18 hours. Pour the reaction into water, stir then filter the colored precipitate. Treat a methylene chloride solution of the solid with Nuchar charcoal, filter through anhydrous magnesium sulfate then remove the solvent in vacuo. Crystallize the residue from methanol to obtain 2.06 g. of the title product; M.P. 95–103°.

The same process may be used to produce a gonapentaen-17-one having a 13-polycarbon alkyl group by starting with the corresponding 17-ol steroid.

Example 3.—dl-3-methoxyestra-1,3,5(10),8,14-pentaen-17-one

Reflux a solution of d-3-methoxyestra-1,3,5(10),8,14-pentaen-17β-ol (5.00 g.) in benzene (150 ml.) and methyl ethyl ketone (80 ml.) under nitrogen into water separator for 0.5 hr. Add a filtered solution of aluminum isopropoxide (8 g.) in benzene (50 ml.) and continue refluxing for 2 hours. Again add a solution of aluminum isopropoxide (3 g.) in benzene (25 ml.) and reflux for one hour more. Cool and add ether then wash the extract with water, dilute hydrochloric acid and brine. Dry the extract over anhydrous sodium sulfate, filter and remove the solvent in vacuo. Dissolve the residue in methanol and filter. Let the solution stand to deposit 1.78 g. of title product, M.P. 133–134°. Further purify a sample (0.50 g.) by treating a methylene chloride solution with Nuchar charcoal, filtering through super cel and replacing the solvent with ethanol by boiling. Allow the solution to stand to deposit 0.36 g. of the title product; M.P. 136–138°; $[\alpha]_D = -98°$ (C.=1, Chf).

*Analysis.*—Calcd. for $C_{19}H_{20}O_2$ (percent): C, 81.39; H, 7.19. Found (percent): C, 81.11; H, 6.94.

Example 4.—d-3-methoxyestra-1,3,5(10),8,14-pentaen-17-one

Dissolve d - 3 - methoxyestra - 1,3,5(10),8,14 - pentaen-17β-ol (7.0 g.) in dry dimethylsulfoxide (50 ml.) and acetic anhydride (35 ml.) and allow the solution to stand at room temperature under nitrogen for 18 hours. Pour the reaction into water and stir. Filter and dry the resulting solid. Dissolve the dry product in methanol filter and let stand to obtain 3.5 g. of the tile product. Further purify the product by recrystallization from ethanol to obtain 2.29 g.; M.P. 135–137°.

Treatment of the d- or l- form of 13-ethyl-3-methoxygona-1,3,5(10),8,14-pentaen-17β-ol will produce the corresponding 17-one by the process of either Example 3 or 4.

The invention claimed is:

1. The process comprising oxidizing an estrogenic pentaene steroid having the formula:

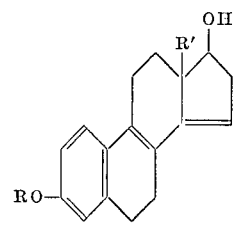

in which R is selected from the group consisting of lower alkyl and cycloalkyl each having no more than 6 carbon atoms, while R' is a lower alkyl of 1 to 4 carbon atoms with acetic anhydride and dimethyl sulfoxide at about room temperature conditions to convert the 17-hydroxy to a 17-keto group without modifying the remainder of the steroid nucleus.

2. The process of claim 1; in which the compound treated is selected from the group consisting of dl-3-methoxyestra-1,3,5(10),8,14-pentaen-17β-ol and its isolated d- form.

References Cited

UNITED STATES PATENTS

| | | | |
|---|---|---|---|
| 3,202,686 | 8/1965 | Hughes et al. | 260—397.45 |
| 3,365,473 | 1/1968 | Taub | 260—397.3 |

HENRY A. FRENCH, Primary Examiner

U.S. Cl. X.R.

260—397.5, 999